US006285949B1

(12) United States Patent
Roediger

(10) Patent No.: US 6,285,949 B1
(45) Date of Patent: Sep. 4, 2001

(54) METHOD AND DEVICE FOR EXTENSIVE TRAFFIC SITUATION MONITORING

(75) Inventor: Malte Roediger, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/177,135

(22) Filed: Oct. 22, 1998

(30) Foreign Application Priority Data

Oct. 22, 1997 (DE) .............................................. 197 46 570

(51) Int. Cl.[7] ........................................................ G06F 7/00

(52) U.S. Cl. .......................... 701/117; 701/119; 340/934; 340/937

(58) Field of Search ..................................... 701/207, 208, 701/117–119; 340/905, 916–919, 934, 937, 988, 995

(56) References Cited

U.S. PATENT DOCUMENTS

| | | | |
|---|---|---|---|
| 5,428,546 | 6/1995 | Shah et al. | 701/207 |
| 5,444,442 | 8/1995 | Sadakata et al. | 340/916 |
| 5,663,720 | 9/1997 | Weissman | 340/934 |

FOREIGN PATENT DOCUMENTS

| | | |
|---|---|---|
| 41 28 312 A1 | 3/1993 | (DE) . |
| 42 37 794 A1 | 5/1994 | (DE) . |
| 195 21 917 | 5/1996 | (DE) . |
| 8-161685 | 6/1986 | (JP) . |
| 6-325287 | 11/1994 | (JP) . |
| 8-221685 | 8/1996 | (JP) . |
| WO 96/13733 | 5/1996 | (WO) . |
| WO 96/35196 | 11/1996 | (WO) . |

*Primary Examiner*—William A Cuchlinski, Jr.
*Assistant Examiner*—Edward Pipala
(74) *Attorney, Agent, or Firm*—Crowell & Moring, L.L.P.

(57) ABSTRACT

A method and a device for extensive traffic situation monitoring of a road network on which vehicles can travel is provided. Remote photographs are taken by aircraft of the area to be monitored, and the images thus taken are subjected to an image-processing process to localize the roads in the road network and to recognize vehicles on them. On the basis of the detected vehicles, conclusions are then drawn about the traffic situation. A device for performing this method incorporates an evaluation center to which the data from the pictures taken by the aircraft are supplied and which has a suitable image-processing system.

9 Claims, 1 Drawing Sheet

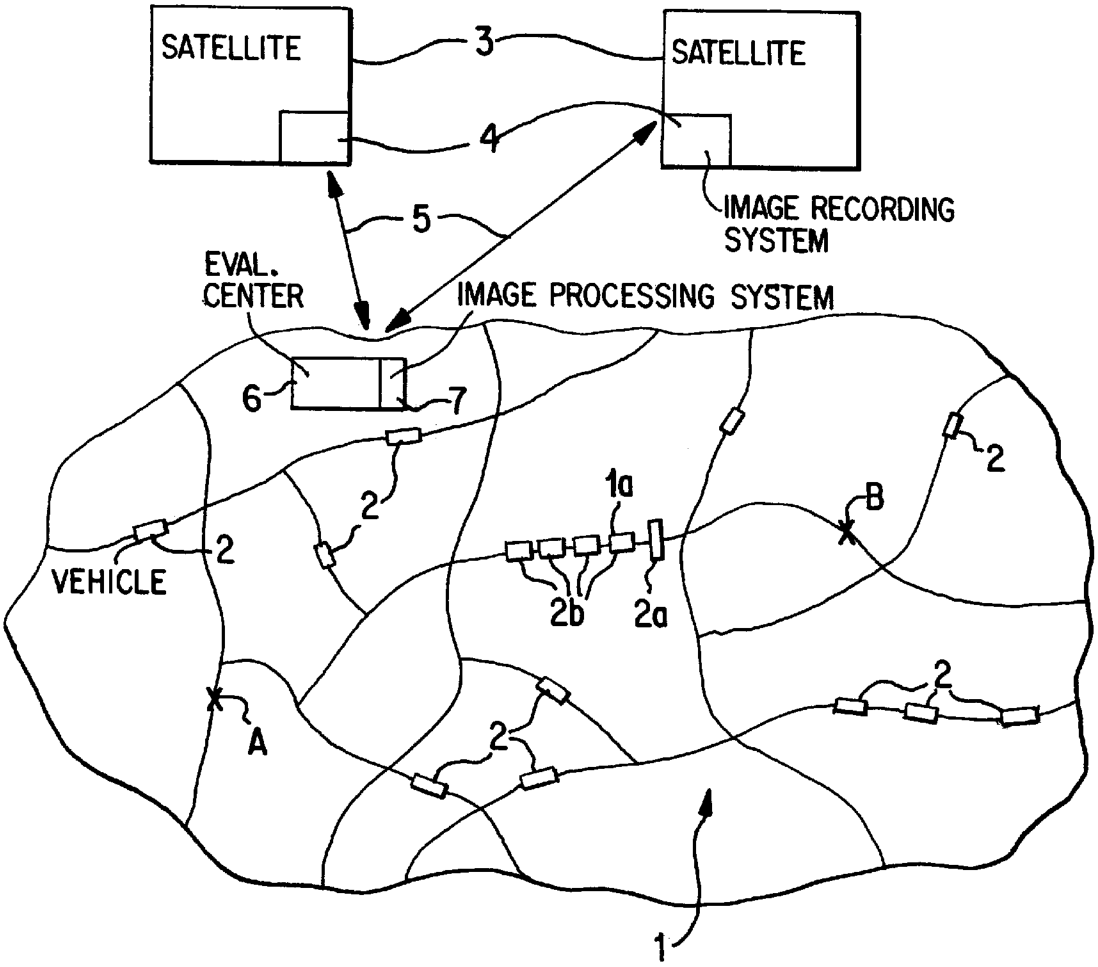
Fig.

METHOD AND DEVICE FOR EXTENSIVE TRAFFIC SITUATION MONITORING

BACKGROUND AND SUMMARY OF THE INVENTION

This application claims the priority of German Patent Application No. 197 46 570.6, filed Oct. 22, 1997.

The invention relates to a method and a device for extensive traffic situation monitoring of a road network on which vehicles can travel. This can be in particular a street network, but it is also possible to have traffic situation monitoring of a rail network or a shipping network.

The prior art patent document WO 96/13733 describes a method for monitoring shipping at sea with detection of oil pollution and icebergs, as well as possible collision risks between ships and/or between ships and icebergs. In this method, oil pollution and icebergs on the surface of the sea are observed and detected by satellite-supported SAR (synthetic aperture radar) microwave sensors. At the same time, a position-determining device is mounted on each vessel that determines the current position of the ship in question and transmits the corresponding position information to whatever satellite is within the visibility range of this position-determining device at that point in time. The satellites then transmit the data on position and size of any detected oil pollution and of any icebergs that are detected as well as the current ship position data received from the vessels to a land-based evaluation center. The evaluation center evaluates these data to identify the cause of the oil pollution and to determine potential collision risks between ships or between a ship and icebergs, and issues a corresponding warning message via the satellites to the ships in question if necessary.

It is known that position determination of vehicles can be performed with the support of a satellite-supported navigation system, for example the GPS (global positioning system). A suitable receiver is installed in the vehicle for this purpose. The receiver receives the position-determination signals transmitted from satellites and evaluates them to determine the position of the vehicle; see for example German Patent document DE 196 21 917 A1.

To monitor the traffic situation, especially in road traffic, infrastructure-supported systems are frequently employed today in which traffic situation data are gathered by measuring devices such as induction coils mounted in the road and fed to a center where they are checked for malfunctions using special algorithms. This requires a considerable expense for the infrastructure along the road network, since the measuring devices must be mounted along every road with spaces between them that are sufficiently small to obtain the desired accuracy of the traffic situation monitoring. In addition, this procedure is very inflexible when it comes to making changes in the road network.

In an infrastructure-supported traffic monitoring system disclosed in German Patent document DE 41 28 312 A1, video cameras are positioned for observing traffic at traffic intersections or at other trouble-prone locations in the traffic network. The pictures taken in this way are analyzed by an associated image processing system using a suitable pattern recognition method specific for vehicle models for the presence of movements in order to determine the number of vehicles of each model that pass the location of an individual video camera.

In another method practiced at the present time, the traffic situation data are gathered manually, with monitoring personnel traveling on the road network in vehicles or flying in helicopters over portions of the road network that are known to be prone to problems, and reporting traffic problems by radio or the like to a center. This method makes it necessary to confirm problem reports before the problem report is issued by radio for example. Because of the relatively long delay this method entails, frequently a problem that has been announced is no longer present, or a problem that has already developed has not yet been announced to drivers.

Recently, the use of specially equipped test vehicles moving in traffic has been proposed as another method for monitoring the traffic situation on the road. These vehicles are designed for determining the local traffic flow encountered by the test vehicle in question and for passing on corresponding traffic flow data. By using a suitable large number of these test vehicles, also called "floating cars," a realistic picture of the extensive traffic situation in the road network can be supplied from the individual local traffic flow data. This type of random sampling for monitoring the traffic situation however is theoretically unable to guarantee that the traffic situation at every point in space and at every point in time on the road network can be detected accurately, and also requires a corresponding expense for specially equipping a large number of test vehicles.

There is therefore needed a method and a device of the above-mentioned type which can solve the above problems by performing reliable extensive traffic situation monitoring at comparatively low expense.

The present invention solves these problems by providing a method for extensive traffic situation monitoring of a road network on which vehicles travel, characterized in that remote photographs are taken of the area to be monitored by aircraft;

the images that are taken are subjected to an image-processing procedure to localize the roads in the road network and to detect vehicles on them; and conclusions about the current traffic situation are drawn from the vehicles recognized, as well as a device for extensive traffic situation monitoring of a road network on which vehicles travel, with one or more aircraft that are equipped with an image-recording system for recording images of the part of the Earth's surface on which road network is located, and an evaluation center that receives image-related data from the aircraft and uses this data to draw conclusions about the traffic situation, wherein the evaluation center includes an image-processing system to which the image data from the images recorded by the aircraft are transmitted and which localizes the roads in the road network in the images that are taken, and recognizes vehicles that are on the road network, and draws conclusions about the traffic situation from the vehicles recognized by the image-processing system.

In the method according to the present invention, pictures of an area to be monitored, in which the road network is located, are taken from a distance by aircraft, especially satellites or airplanes. The pictures received are subjected to automated image processing to localize the roads of the road network in each image and to recognize vehicles on the localized roads. With the aid of the detected vehicle, conclusions are then drawn regarding the traffic situation at the moment.

Advantageously, no roadside infrastructure and no special equipment in the vehicles are required for this method. In addition, satellites and airplanes with which remote photographs of the surface of the ground can be made in the manner required are already known. In addition, automated image-processing techniques for evaluating such images are already in use. Image-processing therefore merely needs to be designed for localization of the roads in question and detection of the vehicles on them, which is possible for the individual skilled in the art without considerable additional expense, on the basis of a conventional image-processing system. The method can thus be implemented relatively inexpensively. The speed with which the traffic situation can be determined reliably by this method, as well as the extensiveness of the determination, in other words at all points in the road network and at any point in time, is advantageous. The method can be extended quickly and simply to new areas of the road network.

In a preferred embodiment of the method according to the invention, the localization of the roads in the pictures taken is performed with the aid of a conventional map-matching method with superimposed vector maps, so that the routes of interest can be reliably determined.

In a further preferred embodiment of the method according to the invention, images of the area to be monitored are taken using various forms of imaging radiation. Depending on the weather conditions, it may be possible to temporarily get better pictures with one type of radiation than with another type of radiation. Then, the most suitable of the pictures can be selected for further evaluation, so that traffic situation monitoring can be performed as independently as possible of the weather conditions while the reliability remains constant.

In another preferred embodiment of the method according to the invention, traffic situation monitoring includes a traffic situation-dependent estimate of travel times between a starting location that can be specified and a target location that can likewise be specified, with the estimate being performed on the basis of vehicles that are on the road network and are detected by the method.

In yet another preferred embodiment of the method according to the invention, images are taken repetitively at predeterminable time intervals of the area to be monitored. On the basis of vehicles that are recognized in the images that are taken successively, the development and/or movement of a traffic problem can be determined, in other words, the dynamics of a given traffic problem can be monitored.

In still another preferred embodiment of the method according to the invention, the spatial position of the detected vehicle is determined by simply recognizing the location where a vehicle is on the road at a given moment. A traffic problem, for example in the form of a traffic accident, is then determined to have occurred from abnormal vehicle positions, for example from the presence of one or more vehicles that are located crosswise to the road or are tipped over.

The device according to the invention is suitable for performing the method according to the invention, for which purpose it has one or more aircraft equipped with image-recording systems for taking pictures of the Earth's surface and for transmitting corresponding image data, as well as an evaluation center that is preferably land-based. The evaluation center incorporates a suitably designed image-processing system for locating the roads in the road network and for recognizing the vehicles on them. The evaluation center also has required conventional means in order to draw conclusions about the traffic situation on the basis of the vehicles that are recognized on the road network. On the other hand, the vehicle does not require any means along the road or aboard the vehicles for monitoring the traffic situation.

The device according to the invention advantageously incorporates a travel-time estimating device that is especially suited for performing the method in which travel times are estimated.

Other objects, advantages and novel features of the present invention will become apparent from the following detailed description of the invention when considered in conjunction with the accompanying drawing.

BRIEF DESCRIPTION OF THE DRAWING

The single FIGURE shows a schematic block diagram of a device for extensive traffic situation monitoring of a road network traveled by vehicles.

DETAILED DESCRIPTION OF THE DOCUMENT

In the FIGURE, a portion of a road network is shown, partially and highly schematically, in the form of a road network 1 that is traveled by vehicles 2, with the traffic situation being monitored over a large area. For this purpose, remote photographs of that portion of the Earth's surface in which the traffic network 1 to be monitored is located are made by one or preferably several satellites 3. For this purpose, each satellite 3 is equipped with a corresponding image-recording system 4. The images can be taken by radar or infrared radiation for example, or by another suitable form of magnetic radiation. Alternatively to satellites, the images can also be taken by aircraft, especially airplanes, or other flying bodies. Satellites 3 are chosen in order to completely cover the entire area in which the roads of the monitored road network 1 are located.

Satellites 3 are in a data exchange coupling with a ground evaluation center 6 by data transmission lines 5 of conventional type. The satellites 3 transmit the data of the pictures they have taken to the evaluation center 6 over these data-transmission lines 5. Evaluation center 6 has an automated image-processing system 7 so designed that it is able to locate the roads in the road network monitored in the remote photographs that have been transmitted and to recognize the vehicles that are on the localized roads. Such image-processing systems with which, using remote photographs from satellites or aircraft, such road localization and high resolution detection of comparatively small objects on the ground such as vehicles is possible are already known and therefore require no further explanation here. In particular, a conventional so-called "map-matching method-"with superimposed vector maps can be used for localization of the roads of the road network in the remote photographs.

Therefore, at a given point in time during monitoring, evaluation center 6 has information about the positions of practically all the vehicles that are on the road network being monitored at the moment, so that it is able to draw reliable conclusions from this information in conventional fashion about the momentary traffic situation. Evaluation center 6 then sends corresponding traffic situation information by radio for example or via a radio network, that can be received in the usual fashion by vehicles 2 equipped with suitable receivers and can be displayed to the driver or otherwise evaluated. For example, the traffic situation information that is transmitted can support a navigation aid device aboard the vehicle in planning routes or finding routes.

In order to guarantee traffic situation monitoring even during different weather conditions, preferably at least two sets of remote photographs are made, with each set covering the entire monitoring area and each based on different image-generating radiation types such as radar radiation, infrared radiation, etc. Evaluation center 6 can then select for further evaluation the remote photographs made with the type of radiation that offers the best image quality for the weather conditions at the moment.

Preferably, not only the position of each vehicle on the road network but also its spatial position at the point in question can be determined by evaluation center 6 through image processing of the remote photographs, in other words evaluation center 6 determines by means of its image-processing system 7 whether the vehicle is in its normal position lengthwise with respect to the road or whether it is crosswise to the road or tipped over. From such abnormal vehicle positions, evaluation center 6 concludes that a traffic problem has occurred that is blocking traffic, for example a traffic accident. The FIGURE shows a situation of this kind schematically with reference to a vehicle 2*a* shown symbolically in a certain portion 1*a* of a road in a crosswise position, behind which a traffic jam, shown schematically and symbolically, composed of a plurality of vehicles 2*b*, has formed.

Advantageously, remote photography of monitored extensive areas of road network 1 is repeated at time intervals that can be set. A computer unit of the evaluation center 6 that performs the further evaluation of the information obtained from image-processing system 7 regarding the position and location of vehicles 2 on road network 1 is then suitably designed so that from the positions and locations of the individual vehicles recognized in the images recorded sequentially, it recognizes not only the development but also the movement, in other words the dynamics, of a given traffic problem. This makes it possible, for example, to make predictions about the development of traffic jams that are detected.

In addition, the evaluating computer unit of the evaluation center 6 can incorporate a travel time estimating device in hardware or software form with which travel times from a starting location, for example a place A in the FIGURE, to a target location that can be selected, for example a place B shown in the FIGURE, on the basis of the traffic situation determined at the moment. Thus, for example, in estimating the travel time from the indicated starting location A to the indicated target location B, the traffic jam that is located on the shortest road connection between these two locations A and B, symbolized by the crosswise vehicle 2*a* and the vehicles 2*b* backed up behind it, can be taken into account. Suitable travel-time estimating algorithms that take the traffic situation between the starting location and the target location into account are known of themselves, so that they need not be discussed in further detail here.

As is clear for example from the above description of an advantageous embodiment, the methods according to the invention and the device according to the invention provide extensive traffic situation monitoring for an extensive area of a road network, with rapid and reliable detection of traffic problems and all subsequent possible applications such as travel time, forecasts, and navigational aid methods. Apart from the special design of the image-processing system as regards the localization of the roads and detection of the vehicles on the roads, use is made of conventional components and methods so that the method according to the invention and the device according to the invention can be put into practice relatively simply. Even in the case of a very large territory to be monitored, a single suitably equipped evaluation center will suffice provided it is in a data exchange coupling with the image-reporting satellites or aircraft. Additional secondary or subservient evaluation centers are not absolutely necessary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for extensive traffic situation monitoring of a road network on which vehicles travel, the method comprising the acts of:

taking remote photographs of an area to be monitored via an aircraft;

image-processing data of the remote photographs in order to localize roads in the road network and to detect the vehicles on the roads; and drawing traffic situation monitoring conclusions about a current traffic situation from the detected vehicles on the roads.

2. A method according to claim 1, wherein the act of localizing the roads in the road network is performed using a map-matching method with superimposed vector paths.

3. The method according to claim 1, wherein the act of taking remote photographs is performed using different types of imaging radiation systems.

4. The method according to claim 3, wherein the different types of imaging radiation systems include radar and infrared radiation.

5. The method according to claim 1, further comprising the act of estimating travel times between a starting location determined in advance and a target location determined in advance from the detected vehicles.

6. The method according to claim 1, further comprising the acts of repeatedly taking images of the area to be monitored at predetermined time intervals; and detecting developments or movements of a given traffic pattern from vehicles that are recognized from the images taken sequentially.

7. The method according to claim 1, further comprising the acts of determining a position of the detected vehicles on the roads via the image-processing process; and determining that a traffic problem has occurred from abnormal vehicle positions.

8. A device for extensive traffic situation monitoring of a road network on which vehicles travel, comprising:

at least one aircraft equipped with an image-recording system for recording images of a portion of the Earth's surface on which the road network is located;

an evaluation center receiving image-related data from the at least one aircraft; and wherein said evaluation center includes an image-processing system to which said image-related data from the image-recording system are transmitted, said image-processing system localizing the roads in the road network in the recorded images, and recognizing vehicles that are on the road network, said evaluation center drawing conclusions about the traffic situation from the vehicles recognized by the image-processing system.

9. The device according to claim 8, wherein said evaluation center further comprises a travel-time estimating device that estimates travel times between a defined starting location and a defined target location on a basis of the recognized vehicles on the roads of the road network.

* * * * *